US007502006B2

(12) United States Patent
Aoki

(10) Patent No.: US 7,502,006 B2
(45) Date of Patent: Mar. 10, 2009

(54) METHOD FOR ADJUSTING ELECTRO-OPTICAL APPARATUS, ADJUSTING APPARATUS OF ELECTRO-OPTICAL APPARATUS, AND ELECTRONIC SYSTEM

(75) Inventor: Toru Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 610 days.

(21) Appl. No.: 10/990,604

(22) Filed: Nov. 18, 2004

(65) Prior Publication Data

US 2005/0162365 A1 Jul. 28, 2005

(30) Foreign Application Priority Data

Nov. 27, 2003 (JP) ............................. 2003-397165
Jun. 30, 2004 (JP) ............................. 2004-193517

(51) Int. Cl.

*G09G 3/36* (2006.01)
*G09G 5/00* (2006.01)
*G09G 5/02* (2006.01)
*G09G 5/10* (2006.01)
*G06F 3/038* (2006.01)

(52) U.S. Cl. ............................. 345/96; 345/87; 345/88; 345/89; 345/204; 345/207; 345/209; 345/214; 345/690; 345/697

(58) Field of Classification Search ............. 345/87–89, 345/96, 204, 207, 209, 214, 690, 697
See application file for complete search history.

(56) References Cited

U.S. PATENT DOCUMENTS

| | | | | |
|---|---|---|---|---|
| 5,774,106 | A * | 6/1998 | Nitta et al. | 345/98 |
| 6,342,876 | B1 * | 1/2002 | Kim | 345/87 |
| 6,593,921 | B2 * | 7/2003 | Nakanishi et al. | 345/208 |

FOREIGN PATENT DOCUMENTS

| | | |
|---|---|---|
| JP | A 8-286169 | 11/1996 |
| JP | A-10-268259 | 10/1998 |
| JP | A 2002-182622 | 6/2002 |
| JP | A 2002-182623 | 6/2002 |
| JP | A 2002-229529 | 8/2002 |
| JP | A 2004-62189 | 2/2004 |

* cited by examiner

*Primary Examiner*—Sumati Lefkowitz
*Assistant Examiner*—Alexander S. Beck
(74) *Attorney, Agent, or Firm*—Oliff & Berridge, PLC

(57) ABSTRACT

A liquid crystal device has a pixel electrode connected to a scanning line and a data line through a TFT, and an opposing electrode opposed to the pixel electrode with a liquid crystal sandwiched therebetween. An almost constant common potential LCcom is applied to the opposing electrode. When this common potential LCcom is adjusted, first, the common potential LCcom is adjusted to a potential Vcom', which minimizes the variation amount of light emitted from the liquid crystal device in the course of displaying a specific image, and, second, the common potential LCcom is set to a potential V0, which is higher than the potential Vcom'. Thus, it is possible to select, in an easy procedure, a common potential which can suppress a flicker while reducing a direct current component applied to the electro-optical material.

11 Claims, 6 Drawing Sheets

METHOD FOR ADJUSTING ELECTRO-OPTICAL APPARATUS, ADJUSTING APPARATUS OF ELECTRO-OPTICAL APPARATUS, AND ELECTRONIC SYSTEM

BACKGROUND OF THE INVENTION

1. Field of Invention

Exemplary aspects of the present invention relate to a technique for adjusting a potential (referred to as "common potential") to be applied to an opposing electrode of an electro-optical apparatus.

2. Description of Related Art

In a related art electro-optical apparatus which displays an image using an electro-optical material, such as a liquid crystal, in particular, alternating current drive is adopted in order to prevent the deterioration of the characteristics of the electro-optical material. For example, in an active matrix liquid crystal device using a thin film transistor as a switching element, an almost constant common potential is applied to an opposing electrode opposed to a plurality of pixel electrodes with a liquid crystal sandwiched. At the same time, an image signal indicating the content of an image is periodically inverted using a predetermined potential as a reference, and then is supplied to each pixel electrode. However, if an effective voltage value applied to a liquid crystal is different depending on when the image signal is positive and when the signal is negative, a phenomenon called a flicker (flicking of the display screen), in which the amount of light emitted from the liquid crystal device varies periodically, might occur.

Techniques for preventing a flicker by adjusting a common potential have been disclosed. In these techniques, the common potential is adjusted such that the periodic variation amount of light emitted from the liquid crystal device in the course of displaying the image is minimized (specifically, to minimize a flicker).

SUMMARY OF THE INVENTION

However, the inventor of the present application has discovered that even if the common potential is selected so as to minimize a flicker, an effective voltage value applied to a liquid crystal when the image signal is positive is not necessarily the same as that when the signal is negative. When the effective voltage value differs in this manner, a direct current component of a voltage is kept applied to the liquid crystal, thereby causing the deterioration of the characteristics of the liquid crystal.

Exemplary aspects of the present invention have been made in view of these and/or other circumstances. Exemplary aspects of the present invention select, in an easy procedure, a common potential which can suppress a flicker while reducing a direct current component applied to an electro-optical material.

Exemplary aspects of the present invention may be adopted, in particular, for an electro-optical apparatus which includes: a plurality of pixel electrodes electrically connected to a switching element disposed at each intersection of a plurality of scanning lines and a plurality of data lines; an opposing electrode opposed to the plurality of pixel electrodes with an electro-optical material sandwiched; a scanning-line drive circuit which selects each of the plurality of scanning lines in sequence and turns on the switching element corresponding to the scanning line; and a data-line drive circuit which supplies an image signal, whose polarity is periodically inverted using a predetermined potential as a reference, to the pixel electrode through the data line and the switching element.

The electro-optical material in an exemplary aspect of the present invention is a material which changes optical characteristics, such as a transmittance ratio and luminance, by imposing electrical energy, such as a current and voltage. A typical example of the electro-optical material is a liquid crystal which changes the transmittance ratio by the change of molecular alignment direction in accordance with the applied voltage. However, the range to which the present invention can be applied is not limited to this. An exemplary aspect of the present invention suppresses a direct current component imposed on the electro-optical material. Thus, exemplary aspects of the present invention are particularly suitable for an electro-optical apparatus using an electro-optical material which may cause a problem, such as deterioration of optical characteristics due to an imposed direct current component.

In order to address and/or solve the above and/or other problem in electro-optical apparatus of this kind, an exemplary aspect of the present invention provides a method to adjust, the voltage applied to an opposing electrode to a voltage higher than a voltage causing a minimum flicker. To give a more detailed description, this method includes a first step of adjusting a common potential applied to the opposing electrode to a potential at which the variation amount of light emitted from the electro-optical apparatus is minimized in the course of displaying a specific image; and a second step of setting the common potential to a potential higher than the potential adjusted in the first step. The voltage of the opposing electrode may be selected such that the variation amount of the light emitted from the electro-optical apparatus becomes a predetermined value or less. Specifically, it is desirable to select the voltage of the opposing electrode such that the effective voltage value applied to a liquid crystal when the image signal is positive is the same as that of when it is negative.

In an electro-optical apparatus having the above-described structure, the voltage held between the pixel electrode and the opposing electrode in a horizontal scanning period gradually decreases when the switching element is in an off state (specifically, when the scanning line is not selected). This is because a current leaks from the pixel electrode through the switching element. Meanwhile, at this time, the leakage amount (degree of leakage) of when the image signal is positive may differ from that of when the image signal is negative. Specifically, the leakage amount of when the positive image signal is supplied is larger than that of when the negative image signal is supplied. Accordingly, the variation amount (attenuation amount) per unit time of the voltage held by the pixel electrode when the image signal is positive becomes larger than that of when the image signal is negative. In this manner, since there is a difference in the attenuation characteristics, given that the effective voltage value to the liquid crystal when the image signal is positive polarity is almost the same as that of when image signal is negative polarity, the amount of light emitted from the liquid crystal device viewed by an observer is different in both cases. Thus, if the common potential is selected so as to minimize a flicker, the result is that the effective voltage value to the liquid crystal when the image signal is positive polarity differs from that of when the image signal is negative polarity. Specifically, the common potential selected in order to minimize a flicker becomes smaller than the potential to eliminate the difference in the effective voltage value to the liquid crystal. Thus, in an exemplary aspect of the present invention, a potential higher than the potential which minimizes a flicker is selected as the common potential. By this method, it is possible to make the effective voltage value of when the image signal is positive polarity come close or be equal to the effective voltage value of when the image signal is negative polarity. Thus, the deterioration of the electro-optical material due to application of a direct current component can be suppressed. Furthermore, the common potential selected in this manner is close to the potential to minimize a flicker, and thus the generation of the flicker is suppressed.

In an electro-optical apparatus, the polarity of the image signal is inverted for each specific period, such as a horizontal scanning period and a vertical scanning period. In the structure in which the polarity of the image signal is inverted for each one or a plurality of vertical scanning periods, it is desirable to supply the image signal corresponding to an intermediate grayscale to each of the plurality of pixel electrodes. In general, in the case of an intermediate grayscale, it is easier to obtain the variation of light emitted from an electro-optical apparatus compared with the cases of the lowest grayscale (black) and the highest grayscale (white). Thus, with this arrangement, even if the variation amount of light emitted from the electro-optical apparatus is very little, it is possible to obtain this variation amount.

Also, an electro-optical apparatus may adopt a structure (structure which adopts so-called line inversion, column inversion, and pixel inversion) in which a plurality of pixel electrodes are divided into a first group and a second group, and the polarity of the image signal supplied to each pixel electrode is inverted such that the polarity of the image signal supplied to the pixel electrodes included in the first group is the opposite to the polarity of the image signal supplied to the pixel electrodes included in the second group. With this arrangement, if an intermediate grayscale is displayed by all the pixel electrodes, for each vertical scanning period, pixels emitting light by a positive image signal and pixels emitting light by a negative image signal are mixed. Thus it becomes difficult to recognize the variation of light emitted in accordance with the polarity of the image signal. Accordingly, when adjusting an electro-optical apparatus having this structure, it is desirable to supply the image signal corresponding to an intermediate grayscale to the pixel electrodes included in the first group, and to supply the image signal corresponding to the lowest grayscale to the pixel electrodes included in the second group. In this mode, out of the first group and the second group whose image signals have polarities opposite to each other, the amount of light emitted from the pixel electrodes included in the second group is suppressed. Thus it is possible to selectively confirm only the amount of emitted light of an intermediate grayscale displayed by the pixel electrodes included in the first group. Accordingly, it becomes possible to easily recognize the variation of the amount of emitted light in accordance with the polarity of the image signal.

For a method of inverting the polarity of the image signal, there is line inversion, in which the polarity of the image signal is inverted for each pixel electrode arranged in an extension direction of the scanning lines, column inversion, in which the polarity of the image signal is inverted for each pixel electrode arranged in an extension direction of the data lines, and pixel inversion, in which the polarity of the image signal is inverted for each adjacent pixel electrode arranged in both directions. Among these, in an electro-optical apparatus adopting the line inversion, a plurality of pixel electrodes are interchangeably divided into a first group and a second group for one or a plurality of lines of pixel electrodes corresponding to each scanning line, and the image signal having the opposite polarity is supplied to the individual groups of the pixel electrodes. When adjusting the common potential for the electro-optical apparatus having this structure, in a first step, it is desirable to supply the image signal corresponding to an intermediate grayscale to the pixel electrodes of each line included in the first group, and to supply the image signal corresponding to the lowest grayscale to the pixel electrodes of each line included in the second group.

In an electro-optical apparatus adopting the column inversion, a plurality of pixel electrodes are interchangeably divided into a first group and a second group for one or a plurality of columns of pixel electrodes corresponding to each data line. Accordingly, when adjusting the common potential for the electro-optical apparatus having this structure, in a first step, it is desirable to supply the image signal corresponding to an intermediate grayscale to the pixel electrodes of each column included in the first group, and to supply the image signal corresponding to the lowest grayscale to the pixel electrodes of each column included in the second group. Furthermore, in an electro-optical apparatus adopting the pixel inversion, a plurality of pixel electrodes are interchangeably divided into a first group and a second group for one or a plurality of the adjacent pixel electrodes in an extension direction (X direction) of the scanning lines and in an extension direction (Y direction) of the data lines. Accordingly, when adjusting the common potential for the electro-optical apparatus having this structure, in a first step, it is desirable to supply the image signal corresponding to an intermediate grayscale to each pixel electrode included in the first group, and to supply the image signal corresponding to the lowest grayscale to each pixel electrode included in the second group. In this regard, here, the line inversion, the column inversion, and the pixel inversion have been exemplified. However, a method for inverting the polarity of the image signal is arbitrary.

In this regard, an exemplary aspect of the present invention can be identified as an apparatus to adjust the common potential in an electro-optical apparatus. Specifically, according to an exemplary aspect of the present invention, there is provided an adjusting apparatus including a light receiving device which receives light emitted from the electro-optical apparatus and outputs an electrical signal in accordance with the received light amount; an adjusting device which adjusts a common potential to a potential causing the electronic signal output from the light receiving device to have a minimum amplitude (specifically, in order to minimize the variation amount of light emitted from the electro-optical apparatus); and a setting device which sets the common potential to a potential higher than the potential adjusted by the adjusting device. By this adjusting apparatus, for the same reason as the adjusting method described above, it is possible to reduce a direct current component applied to the electro-optical material, and to suppress a flicker. In this regard, a structure, which is further provided with a display control device to indicate an image to be displayed to the electro-optical apparatus in the first step, may be adopted. The image content (a grayscale indicated by the image signal) indicated in the electro-optical apparatus with this structure is the same as the example shown for the adjusting method described above.

DETAILED DESCRIPTION OF EXEMPLARY EMBODIMENTS

A: Configuration of Liquid Crystal Device

Figure 1:
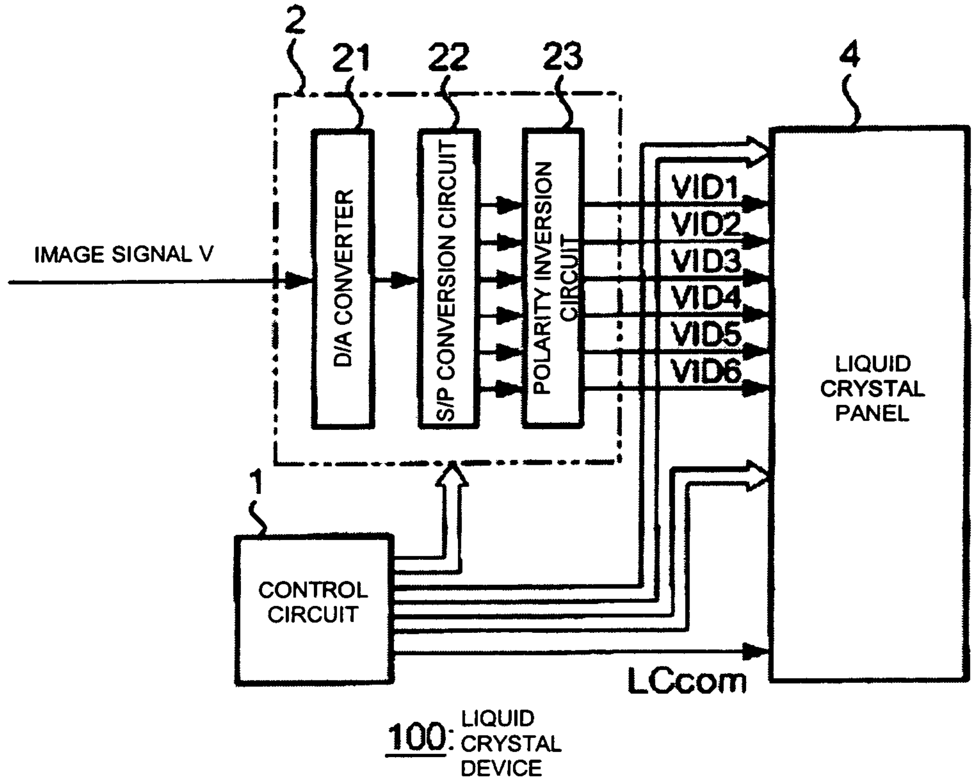
FIG. 1 is a schematic illustrating the configuration of a liquid crystal device according to an exemplary embodiment of the present invention.

First, a description will be given of an exemplary embodiment of an electro-optical apparatus whose common potential is adjusted by the method according to an exemplary aspect of the present invention. This electro-optical apparatus is a liquid crystal device which adopts a liquid crystal as an electro-optical material. As shown in FIG. 1, a liquid crystal device 100 has a control circuit 1, an image signal processing circuit 2, and a liquid crystal panel 4. Among these, the control circuit 1 is a circuit to control each part of the liquid crystal device 100 based on the control signals supplied from various upper units, such as a CPU (Central Processing Unit) of an electronic system in which the liquid crystal device 100 is mounted.

The image signal processing circuit 2 is a circuit to process a digital image signal V supplied from an upper unit to output a signal suited to be supplied to the liquid crystal panel 4. The image signal processing circuit 2 has a D/A (Digital To Analog) converter 21, an S/P (Serial To Parallel) conversion circuit 22, and a polarity inversion circuit 23. The S/P conversion circuit 22 expands the analog image signal V generated by the D/A converter 21 into N systems (in this exemplary embodiment, N=6), extends the image signal of each system to N times in a time axis direction, and outputs it (Refer to FIG. 4). At the same time, the polarity inversion circuit 23 performs polarity inversion on the image signals of the six systems, and appropriately amplifies the signals, and then outputs the signals to the liquid crystal panel 4 as image signals VID (VID1, VID2, . . . , VID6). Here, polarity inversion is processing which interchangeably switches the voltage level of the image signals VID1 to VID6 from one to the other of positive polarity and negative polarity using a predetermined voltage Vc as a reference. The image signal VID to be the target of the polarity inversion is appropriately selected in accordance with whether a method of applying a voltage to each pixel is (1) a method of inverting polarity for each vertical scanning period (so-called frame inversion), (2) a method of inverting polarity for each pixel connected to a common scanning line 411 (so-called line inversion), (3) a method of inverting polarity for each pixel connected to a common data line 412 (so-called column inversion), or (4) a method of inverting polarity for each adjacent pixel (so-called pixel inversion). The inversion cycle thereof is set to one dot-clock cycle, one horizontal-scanning period, or one vertical-scanning period. However, in the present exemplary embodiment, as described above (1), an assumption is made of the case of adopting a method of inverting the polarity of the image signal VID for each vertical scanning period.

Figure 2:
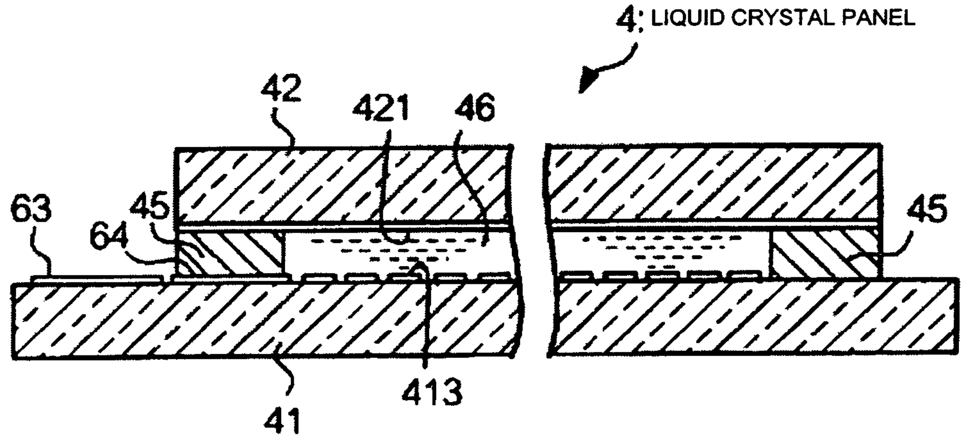
FIG. 2 is a schematic illustrating the structure of the liquid crystal device.

The liquid crystal panel 4 displays an arbitrary image by a plurality of pixels arranged in a matrix extending in an X direction (line direction) and in a Y direction (column direction). As shown in FIG. 2, the liquid crystal panel 4 has an element substrate 41 and an opposing substrate 42, which are bonded opposed to each other through a sealing material 45 formed in nearly a rectangular frame. For example, the space surrounded by both of the substrates and the sealing material 45 is filled with a TN (Twisted Nematic) liquid crystal 46 as an electro-optical material, and is sealed.

On the opposing substrate 42, an opposing electrode 421 is disposed nearly all over the surface of the plate opposed to the element substrate 41. This opposing electrode 421 is electrically connected to the wiring lines (omitted in the figure) on the element substrate 41 through a conductive material disposed at least one of the four corners of the opposing substrate 42. The control circuit 1 applies an almost constant common potential LCcom to the opposing electrode 421 through these wiring lines, and at the same time, changes the common potential LCcom based on the instruction given from the upper unit. In this regard, a colored layer (color filter) and a light shielding layer (black matrix) are disposed on the plate surface of the opposing substrate 42, but are omitted in FIG. 2.

Next, with reference to FIG. 3, a description will be given of the electrical configuration of each element disposed on the element substrate 41. As shown in the figure, of the element substrate 41, on the surface of the plate opposed to the opposing substrate 42, m (m is a natural number of 2 or more) scanning lines 411, which are extending in an X direction to be connected to a scanning-line drive circuit 61, and 6*n* (n is a natural number of 1 or more) data lines 412, which are extending in a Y direction to be connected to a data-line drive circuit 63 are disposed. In this exemplary embodiment, 6*n* in total of the data lines 412 are divided into n blocks (B1, B2, . . . , Bn) with 6 lines, which correspond to the number of phase expansions of the image signal VID, as a unit. Six image signals VID1, VID2, . . . , VID6, which have undergone phase expansion by the S/P conversion circuit 22, are simultaneously supplied to each of the 6 data lines 412 included in one block Bj (j is a natural number from 1 to n), respectively.

Figure 3:
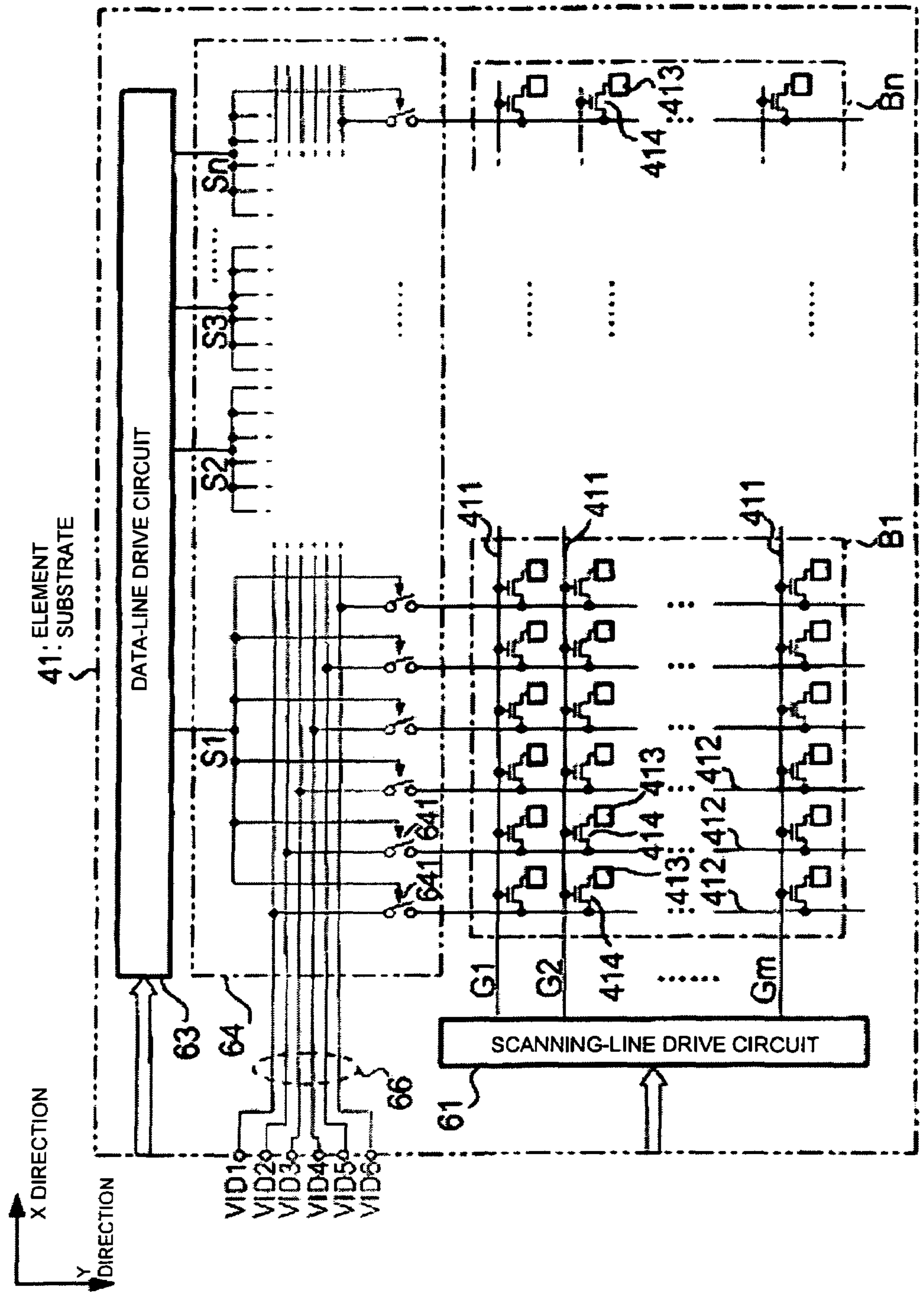
FIG. 3 is a schematic illustrating the structure on an element substrate 41 of the liquid crystal device.

As shown in FIGS. 2 and 3, a pixel electrode 413 is disposed at each intersection of a plurality of the scanning lines 411 and a plurality of the data lines 412. Each pixel electrode 413 is an almost rectangular electrode opposed to the opposing electrode 421 sandwiching the liquid crystal 46, and is electrically connected to a thin film transistor (in the following, referred to as a TFT (Thin Film Transistor)) 414 disposed at the intersection between the scanning lines 411 and the data lines 412. Specifically, the gate of a TFT 414 is connected to the scanning line 411, the source of the TFT 414 is connected to the data line 412, and the drain of the TFT 414 is connected to a pixel electrode 413. Accordingly, the pixels, which are constituted by the pixel electrode 413, the opposing electrode 421, and the liquid crystal 46 sandwiched between both of the electrodes, are arranged in a matrix state extending in an X direction and in a Y direction. The liquid crystal panel 4 according to the present exemplary embodiment is a so-called normally-white mode panel, in which the display grayscale of the pixel is the brightest (white display) when the voltage applied to the liquid crystal 46 is at a minimum, and the display grayscale of the pixel gradually becomes darker as the voltage increases.

Figure 4:
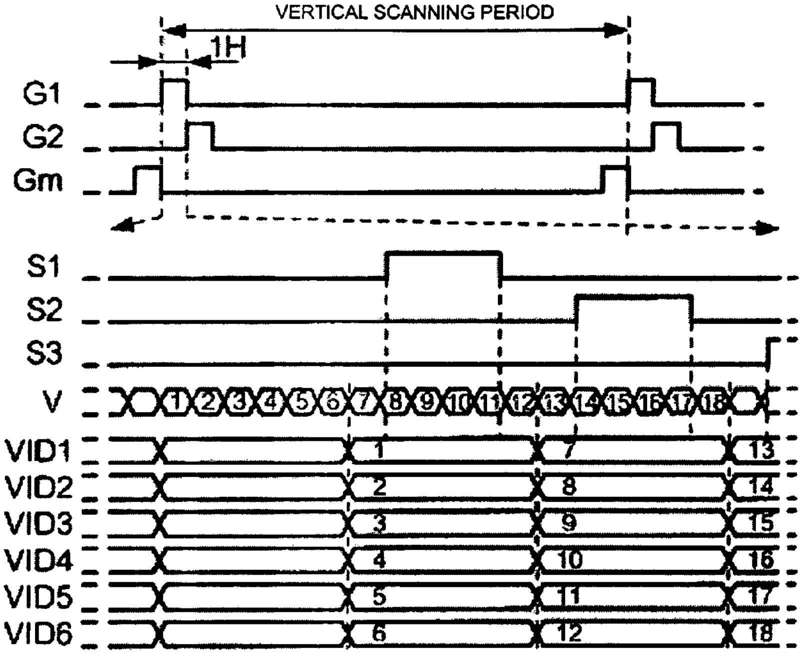
FIG. 4 is a timing chart for explaining the operation of the liquid crystal device.

The scanning-line drive circuit 61 is a circuit which selects each of the m scanning lines 411 in sequence under the control of the control circuit 1. To give a more detailed explanation, as shown in FIG. 4, the scanning-line drive circuit 61 turns scanning signals G1, G2, . . . , Gm supplied to each of the m scanning lines 411 to an active level (H level) in sequence for each horizontal scanning period. When a scanning signal Gi (i is a natural number from 1 to m) supplied to each scanning line 411 is turned to an active level, one line of the TFTs 414 connected to the scanning line 411 are simultaneously turned on.

The data-line drive circuit 63 shown in FIG. 3 is a circuit to apply a voltage to the pixel electrodes 413 through each of the data lines 412 under the control of the control circuit 1. Specifically, as shown in FIG. 4, the data-line drive circuit 63 turns sampling signals S1, S2, . . . , Sn to an active level in sequence in one horizontal scanning period. In this regard, as shown in the figure, the period in which the sampling signals S1, S2, . . . , Sn become an active level do not duplicate on a time axis. The sampling circuit 64 shown in FIG. 3 is a circuit which samples image signals VID1 to VID6 supplied through 6 image signal lines 66 on each data line 412 based on the sampling signals S1, S2, . . . , Sn, and has a sampling switch 641 for each data line 412. To give a more detailed description, among the n blocks described above, 6 sampling switches 641 connected to the data line 412 included in the j-th block from left in FIG. 3 are turned on during a period in which the sampling signals Sj supplied from the data-line drive circuit 63 maintain an active level.

With the configuration described above, in a certain horizontal scanning period, when the scanning signal Gi becomes an active level, and **6*n* TFTs 414 included in the i-th line is turned on, 6*n* sampling switches 641 connected to each data line 412 are turned on for each block by the sampling signals S1 to Sn. Thus the image signals VID1 to VID6 are simultaneously supplied to the 6 data lines 412 included in that block. As a result, in the horizontal scanning period in which the i-th scanning line 411 is selected, voltages in accordance with the image signals VID1 to VID6 are applied to the 6*n* pixel electrodes 413 connected to this i-th scanning line 411. Also, assuming that the polarity of each image signal VID is positive in this vertical scanning period, the polarity of each image signal VID is set to negative in the next vertical scanning period. As a result of the repetition of such operations, the alignment direction of the liquid crystal 46 is changed in accordance with the potential difference between each pixel electrode 413 and the opposing electrode 421**. Thus, a predetermined image is displayed.

Figure 5:
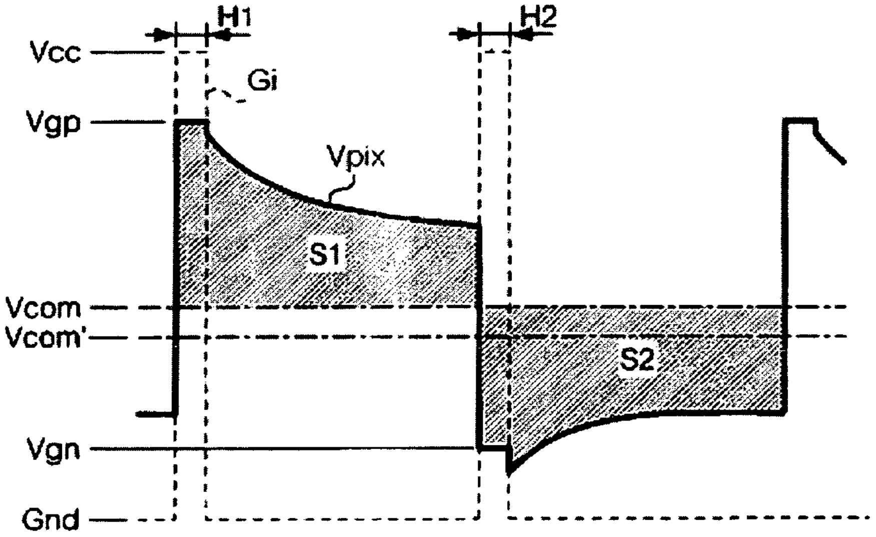
FIG. 5 is a timing chart illustrating the waveform of the potential of a pixel electrode 413 in the liquid crystal device.

Next, attention is focused on one pixel electrode 413 included in the i-th line, and a description will be given of the time-series change of a potential Vpix (in the following, referred to as a "driving potential") applied to this pixel electrode 413. FIG. 5 is a timing chart illustrating the state of the change of the driving potential Vpix. In the figure, the case where an intermediate grayscale (gray) is displayed by the pixels including this pixel electrode 413 is assumed. Also, it is assumed that, in the horizontal scanning period H1 shown in the figure, a positive image signal VID is supplied to the pixel electrode 413, and in the horizontal scanning period H2 after the elapse of one vertical scanning period from here, a negative image signal VID is supplied to the pixel electrode 413.

As shown by broken lines in the figure, when the scanning signal Gi changes from a non-active level (the lower potential Gnd of the power source) to an active level (higher potential Vcc) and the TFT 414 is turned on, the potential Vgp in accordance with the positive image signal VID corresponding to an intermediate grayscale is applied to the pixel electrode 413 as a driving potential Vpix. This driving potential Vpix is maintained during the period (referred to as a "non-selected period") from the time when the scanning signal Gi changes to a non-active level and the TFT 414 is turned off to the time when the scanning signal Gi changes to an active level in the next horizontal scanning period H2. In this regard, the reason why the driving potential V decreases in a moment at the timing of the change of the scanning signal Gi to a non-active level as shown in the figure is that the effect of the variation of the scanning signal Gi extends the drain potential of the TFT 414 (so-called push down occurs) due to the occurrence of parasitic capacitance between the gate and the drain of the TFT 414. In the horizontal scanning period H2, the potential Vgn in accordance with the negative image signal VID corresponding to an intermediate grayscale is applied to the pixel electrode 413 as a driving potential Vpix, and is maintained during the subsequent non-selected period.

As described above, the driving potential Vpix applied to the pixel electrode 413 is maintained during the non-selected period by the capacitance constituted by the pixel electrode 413 and the opposing electrode 421. However, in reality, because of the occurrence of current leakage through the TFT 414, the driving potential Vpix maintained in the pixel electrode 413 is attenuated with the elapse of time in the non-selected period. As shown in FIG. 5, the degree (the variation amount per unit time) of attenuation of the driving potential Vpix is different from the case where a positive image signal VID is supplied to the pixel electrode 413 (referred to as "positive polarity write time") and the case where a negative image signal VID is supplied (referred to as "negative polarity write time"). A description will be given of the reason that this difference arises with reference to FIG. 6.

Figure 6:
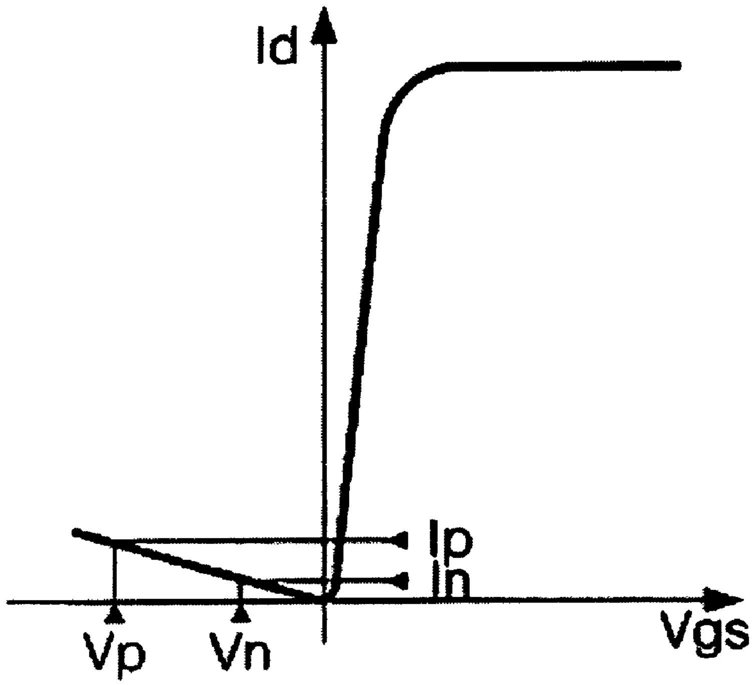
FIG. 6 is a graph illustrating the relationship between the gate-source voltage of a TFT and the drain current.

FIG. 6 is a graph illustrating the relationship between the gate-source voltage Vgs of the TFT 414 and the source-drain current Id of the TFT 414. In a horizontal scanning period, since the scanning signal Gi becomes an active level, and the gate potential of the TFT 414 becomes higher than the source potential, as shown in FIG. 6, the source-drain current Ip flows, and the driving potential Vpix is maintained in the pixel electrode 413. As shown in FIG. 6, when the gate-source voltage Vgs is negative, the source-drain current Id (specifically, a leak current) also flows through TFT 414. When the TFT 414 is an element formed on the plate surface of the element substrate 41 by a polysilicon process, this tendency becomes especially remarkable.

Here, in the non-selected period of the i-th line pixel electrodes 413, in which the scanning signal Gi maintains the lower potential Gnd, the gate-source voltage Vgs of the TFT 414 connected to that pixel electrode 413 corresponds the difference between the lower potential Gnd and the potential (Vgp or Vgn) of the image signal VID supplied to another pixel electrode 413 through the data lines 412. Accordingly, as shown in FIG. 6, the voltage Vp applied between the gate and the source of the TFT 414 in the vertical scanning period when the positive image signal VID is supplied to the data lines 412, the voltage Vp applied between the gate and the source of the TFT 414 becomes smaller (the absolute value becomes large) than the voltage Vn applied between the gate and the source of the TFT 414 in the vertical scanning period when the negative image signal VID is supplied. As shown in the figure, when the gate-source voltage Vgs is negative, the smaller this voltage Vgs, the larger the leakage current Id becomes. Accordingly, the leakage current Ip at positive polarity write time becomes larger than the leakage current In at negative polarity write time. As a result, as shown in FIG. 5, the variation amount per unit time (attenuation amount) of the driving potential Vpix maintained in the pixel electrode 413 at positive polarity write time becomes larger than that at negative polarity write time.

In this manner, since there is a difference in the attenuation characteristics of the driving potential Vpix maintained by the pixel electrode 413, given that the effective voltage value to the liquid crystal 46 of when writing positive polarity is almost the same as that of when writing negative polarity, the amount of light emitted from the liquid crystal device 100 viewed by an observer at positive polarity write time is different from that at negative polarity write time. Thus, if the common potential LCcom is selected so as to minimize a flicker, the result is that the effective voltage value to the liquid crystal 46 differs at positive polarity write time and at negative polarity write time. In FIG. 5, a potential Vcom, which is selected such that the effective voltage value (the area of an area S1) applied to the liquid crystal 46 at positive polarity write time is equal to the effective voltage value (the area of an area S2) applied to the liquid crystal 46 at negative polarity write time, and a potential Vcom' selected to minimize a flicker are shown. As shown in the figure, the potential Vcom' is smaller than the potential Vcom. Thus, if the common potential LCcom is adjusted to the potential Vcom' based only on the degree of the flicker, a direct current component of the voltage is applied to the liquid crystal 46, and the deterioration of the characteristics might occur. In order to address and/or solve this and/or other problems, in the present exemplary embodiment, the common potential LCcom applied to the opposing electrode 421 is set to a potential V0 higher than the potential Vcom' which minimizes a flicker. A detailed description of this method of adjusting is as follows.

B: Method For Adjusting The Common Potential LCcom

Figure 7:
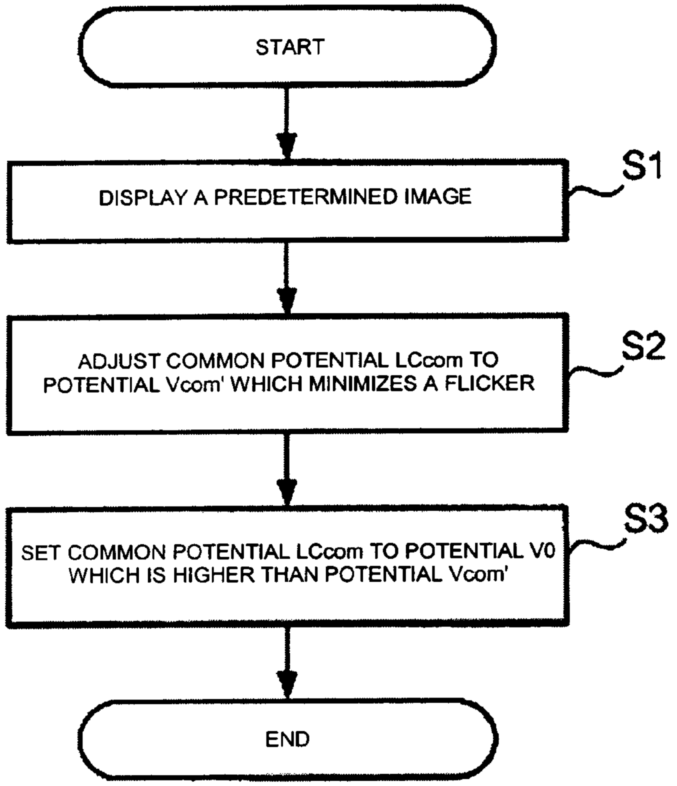
FIG. 7 is a flowchart illustrating the flow of the processing to adjust the common potential of the liquid crystal device.

FIG. 7 is a flowchart illustrating the flow of the processing to adjust the common potential LCcom. As show in the figure, first, displaying a specific image is instructed to the liquid crystal device 100 (step S1). In the present exemplary embodiment, an assumption is made that the polarity of the image signal VID is inverted for each vertical scanning period. Thus an instruction is given to all the pixels to display an intermediate grayscale in the step S1. The reason why the display grayscale is set to an intermediate grayscale is that a very little variation of the amount of light emitted from the liquid crystal device 100 appears more remarkably for an intermediate grayscale compared with black color or white color. Thus it is easier for the operator to view this.

Figure 8:
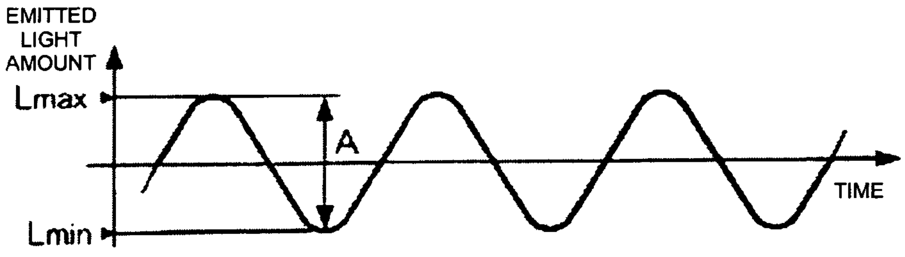
FIG. 8 is a schematic illustrating the state of the variation of the amount of light emitted from the liquid crystal device.
Figure 9:
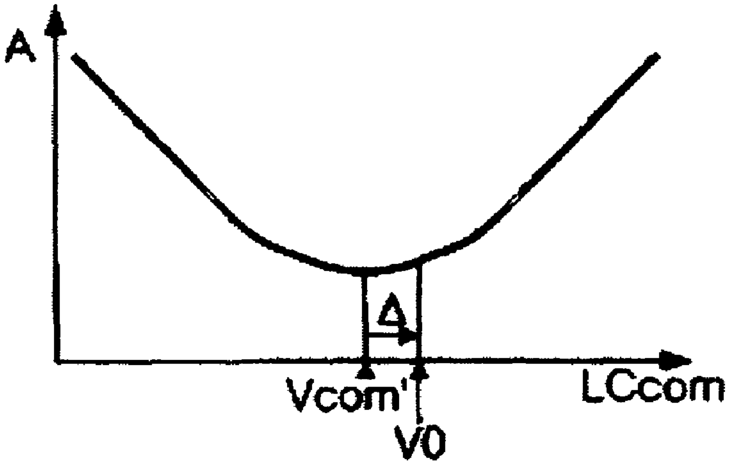
FIG. 9 is a graph illustrating the relationship between the common potential and the variation amount of emitted light.

Next, the common potential LCcom of the liquid crystal device 100 is adjusted so as to minimize a flicker of the display screen (step S2). That is to say, the operator adjusts the common potential LCcom by appropriately operating the operation element (omitted in the figure) of the liquid crystal device 100 while viewing the display image, and stops the adjustment when the flicker becomes the minimum. Thus the common potential LCcom is adjusted to the potential Vcom' described above. Here, FIG. 8 is a schematic illustrating the time-series variation of the amount of light emitting from the liquid crystal device 100. As shown in the figure, when the common potential LCcom is different from the potential Vcom', a flicker which changes the amount of the light (luminance) emitted at a cycle of about 30 Hz corresponding to a half of the frame frequency (about 60 Hz), is observed. The variation A shown in the figure is a parameter indicating the degree of a flicker, and is defined as a difference between the maximum value Lmax and the minimum value Lmin of the amount of the emitted light. As shown in FIG. 9, this variation amount A has a minimum value when the common potential LCcom is equal to the potential Vcom' described above, and increases as the common potential LCcom is apart from the potential Vcom'. In step S2, the operator appropriately adjusts the common potential LCcom while viewing the display image, and adjusts the common potential LCcom to the potential Vcom' so as to minimize this variation amount A.

Subsequently, as shown in FIG. 9, the common potential LCcom is set to a potential V0, which is higher than the adjusted potential Vcom' in step S2 (step S3). Specifically, the common potential LCcom is changed from the potential Vcom' shown in FIG. 5 in a direction toward Vcom. The variation amount A at this time is determined such that the effective voltage value applied to the liquid crystal 46 at positive polarity write time and the effective voltage value applied to the liquid crystal 46 at negative polarity write time become almost equal. Specifically, the amount is determined from the experiment such that the common potential LCcom becomes almost equal to the potential Vcom described above.

By setting the common potential LCcom to the potential V0 through the above procedure, the effective voltage value to the liquid crystal 46 at positive polarity write time can be made to come close, or be equal to that at negative polarity write time. Thus, according to the present exemplary embodiment, the deterioration of the liquid crystal 46 due to the imposing of a direct current component can be suppressed by a very easy procedure. Furthermore, in advance of the procedure to adjust to the potential V0, the common potential LCcom is adjusted to the potential Vcom'. Accordingly, the potential V0 becomes a value close to the potential Vcom', and thus the generation of a flicker is reduced.

Here, the operation element of the liquid crystal device 100 is contained in the liquid crystal device 100, and may be a variable resistor, for example, such as a pre-set volume, etc., to adjust the common potential LCcom to the potential V0 using a power source voltage output from an internal power source to the liquid crystal device 100 in the electronic system to which the liquid crystal device is applied.

C: Modifications

Various modifications are possible for the above-described exemplary embodiment. Specific modifications are described as follows.

Figure 10:
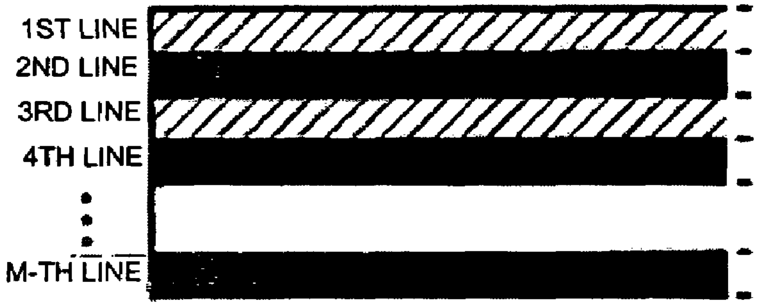
FIG. 10 is a schematic illustrating an image displayed to a liquid crystal device in the adjusting method according to a modification.

(1) In the above-described exemplary embodiment, an example having a structure in which the polarity of the image signal VID is inverted for each vertical scanning period is shown. However, the cycle of this polarity inversion is arbitrary. For example, a structure, in which the polarity of the image signal VID is inverted for each two vertical scanning periods or more, may be employed. Also, a structure, in which the polarity of the image signal VID is inverted for each one or a plurality of horizontal scanning periods (that is to say, for each of the **6*n* pixel electrodes 413 connected to the common scanning line 411), may be employed. In the above-described exemplary embodiment, to adjust the common potential LCcom, an intermediate grayscale is displayed to all the pixels. However, for example, when adjusting the common potential LCcom in a liquid crystal device 100 in which the polarity of the image signal VID is inverted for each one horizontal scanning period, in step S1 of FIG. 7, it is desirable to interchangeably display an intermediate grayscale and the lowest grayscale (specifically, the grayscale corresponding to black) for each adjacent line with each other as shown in FIG. 10. For example, the image signal VID corresponding to an intermediate grayscale is supplied to the pixel electrode 413 connected to the scanning lines 411 which are odd-numbered when counted from the top of the display area. Whereas the image signal VID corresponding to black is supplied to the pixel electrode 413 connected to the even-numbered scanning lines 411. When an intermediate grayscale is displayed to all the pixel electrode 413 using the structure in which the polarity of the image signal VID is inverted for each horizontal scanning period, the variation of light emitted from the liquid crystal device 100** occurs to have inverted phase for each line. For example, when the amount of light emitted from pixels included in odd-numbered lines increases, the amount of light emitted from pixels included in even-numbered lines decreases. Accordingly, in this case, it becomes difficult to correctly recognize the variation of the amount of light emitted from the entire display area. In contrast, when an intermediate grayscale and the lowest grayscale are interchangeably displayed for each line, it is possible to selectively confirm only the amount of light emitted from the pixels which display the intermediate grayscale. Thus, it is possible to recognize the occurrence of a flicker correctly and in detail.

For the same reason, when adjusting the common potential LCcom in a liquid crystal device 100 in which the polarity of the image signal VID is inverted for each plurality of horizontal scanning periods (specifically, for each plurality of lines of pixel electrodes 413 connected to a plurality of adjacent scanning lines 411), it is desirable to interchangeably display an intermediate grayscale and the lowest grayscale for each plurality of lines to be a unit of the polarity inversion. For example, in a certain horizontal scanning period, an intermediate grayscale is displayed by a plurality of lines of pixel electrodes 413 to which the image signal VID of the same polarity is supplied. Whereas the lowest grayscale is displayed by a plurality of lines of pixel electrodes 413 to which the image signal VID of the opposite polarity is supplied. In this manner, in an exemplary aspect of the present invention, a plurality of pixel electrodes 413 are divided into two groups, each of which includes the pixel electrodes 413 having the common variation mode of the polarity of the image signal VID (for example, the pixel electrodes 413 to which the positive image signal VID is supplied in a certain vertical scanning period are put together into a first group, and the pixel electrodes 413 to which the negative image signal VID is supplied in the same vertical scanning period are put together into a second group). It is desirable to display one of the intermediate grayscale and the lowest grayscale by the pixel electrodes 413 included in one of these groups, and at the same time, to display the other of the intermediate grayscale and the lowest grayscale by the pixel electrodes 413 included in the other group. For example, in a liquid crystal device 100 (specifically, a device adopting pixel inversion) which inverts the polarity of the image signal VID for each of the pixel electrodes 413 adjacent in an X direction or a Y direction, it is desirable to display the image (so-called a checkered pattern) in which the intermediate grayscale and the lowest grayscale are interchangeably arranged for each of the pixel electrodes 413 adjacent in an X direction or a Y direction. In the same manner, in a liquid crystal device 100 (specifically, a device adopting column inversion) which inverts the polarity of the image signal VID for the pixel electrodes 413 of each column corresponding to a data line, it is desirable to display the image (specifically, the image in which the intermediate grayscale lines and the lowest grayscale lines which extend in a Y direction are arranged in a stripe state) in which the intermediate grayscale and the lowest grayscale are interchangeably arranged for the pixel electrodes 413 of each column.

(2) In the above-described exemplary embodiment, an example of the structure, in which the operator adjusts the common potential LCcom by viewing the display image by the liquid crystal device 100, is shown. However, a structure, in which the common potential LCcom is adjusted using an adjusting apparatus, may also be adopted. Specifically, this adjusting apparatus includes a light receiving circuit (for example, a CCD (Charge Coupled Device)) which outputs an electrical signal in accordance with the amount of light received from the liquid crystal device 100), an adjusting circuit which adjusts the common potential LCcom to the potential Vcom' such that the amplitude (specifically, the variation amount A of light emitted from the liquid crystal device 100) of the electrical signal from this light receiving circuit is minimized, and a setting circuit which sets the common potential LCcom to a potential V0 higher than the adjusted value Vcom' by the adjusting circuit. By adjusting the common potential LCcom using the adjusting apparatus in this manner, it is possible to suppress variations of the common potential LCcom compared with the case of the adjustment performed by the operator. This adjusting apparatus may be a separate apparatus from the liquid crystal device 100. Alternatively, the apparatus may be partly or wholly included in the liquid crystal device 100 (for example, an apparatus whose adjusting circuit and setting circuit are contained in the control circuit 1 of FIG. 1). In this regard, adjusting the common potential LCcom to the potential Vcom' and adjusting the common potential LCcom to a higher potential V0 may also be achieved by the execution of a program by a computer with an operation unit such as a CPU, or the like, for example. Also, between the light receiving circuit and the adjusting circuit, a filter circuit, which selectively passes only a component included in a specific frequency band (for example, a frequency band of about 30 Hz, which especially causes a problem of a flicker) out of the electrical signal output from the light receiving circuit, may be provided.

(3) The device to be the target, in which the common potential LCcom is adjusted by the adjusting method according to an exemplary aspect of the present invention, is not limited to a liquid crystal device using a liquid crystal as a electro-optical material. Exemplary aspects of the present invention suppress a direct current component for an electro-optical material. Exemplary aspects of the present invention, therefore, may be used for an electro-optical apparatus using an electro-optical material which might cause a problem, such as deterioration of the characteristics by the application of a direct current component.

What is claimed is:

1. A method to adjust an electro-optical apparatus, the electro-optical apparatus including a plurality of pixel electrodes electrically connected to a switching element disposed at each intersection of a plurality of scanning lines and a plurality of data lines, an opposing electrode opposed to the plurality of pixel electrodes with an electro-optical material sandwiched there between, a scanning-line drive circuit which selects each of the plurality of scanning lines in sequence and turns on the switching element corresponding to the scanning line, and a data-line drive circuit which supplies an image signal, whose polarity is periodically inverted with respect to a predetermined potential as a standard, to the pixel electrode through the data line and the switching element, the method comprising:

first adjusting, while displaying a certain image, a common potential applied to the opposing electrode to a potential at which a variation amount of light emitted from the electro-optical apparatus is minimized; and second setting the common potential to a potential higher than the potential adjusted in the first adjusting so as to suppress a difference between an effective voltage value corresponding to when the image signal is of positive polarity and an effective voltage value corresponding to when the image signal is of negative polarity, the difference being attributable to effects of variation of a potential at the pixel electrode through the switching element during a transition from an active level to a non-active level of the scanning line.

2. The method to adjust an electro-optical apparatus according to claim 1, further including inverting the polarity of the image signal for each one or a plurality of vertical scanning periods, at the same time, the first adjusting including supplying an image signal corresponding to a grayscale to each of the plurality of pixel electrodes.

3. The method to adjust an electro-optical apparatus according to claim 1, further including:

inverting the polarity of the image signal supplied to each pixel electrode such that the polarity of the image signal supplied to pixel electrodes included in a first group of the plurality of pixel electrodes is the opposite to the polarity of the image signal supplied to pixel electrodes included in a second group, which is different from the first group, at the same time, the first adjusting including supplying an image signal corresponding to an intermediate grayscale to the pixel electrodes included in the first group, and supplying an image signal corresponding to the lowest grayscale to the pixel electrodes included in the second group.

4. The method to adjust an electro-optical apparatus according to claim 3, further including interchangeably dividing the plurality of pixel electrodes into the first group and the second group for each one line of or a plurality of lines of pixel electrodes corresponding to each of the scanning lines, the first adjusting including supplying an image signal corresponding to an intermediate grayscale to the pixel electrodes of each line included in the first group, and supplying an image signal corresponding to the lowest grayscale to the pixel electrodes of each line included in the second group.

5. The method to adjust an electro-optical apparatus according to claim 3, further including interchangeably dividing the plurality of pixel electrodes into the first group and the second group for each one column of or a plurality of columns of pixel electrodes corresponding to each of the data lines, the first adjusting including supplying an image signal corresponding to an intermediate grayscale to the pixel electrodes of each column included in the first group, and supplying an image signal corresponding to the lowest grayscale to the pixel electrodes of each column included in the second group.

6. The method to adjust an electro-optical apparatus according to claim 3, further including interchangeably dividing the plurality of pixel electrodes into the first group and the second group for each one or a plurality of pixel electrodes adjacent along an extending direction of the scanning line and an extending direction of the data line, the first adjusting including supplying an image signal corresponding to an intermediate grayscale to each pixel electrode included in the first group, and supplying an image signal corresponding to the lowest grayscale to each pixel electrode included in the second group.

7. The method to adjust an electro-optical apparatus according to claim 1, wherein the effective voltage value corresponding to when the image signal is of positive polarity is substantially similar to an effective voltage corresponding to when the image signal is of negative polarity.

8. An adjusting apparatus for an electro-optical apparatus, comprising:

a plurality of scanning lines;

a plurality of data lines;

a switching element disposed at each intersection of the plurality of scanning lines and the plurality of data lines;

a plurality of pixel electrodes electrically connected to the switching element;

an opposing electrode opposed to the plurality of pixel electrodes with an electro-optical material sandwiched there between;

a scanning-line drive circuit which selects each of the plurality of scanning lines in sequence and turns on the switching element corresponding to the scanning line; and a data-line drive circuit which supplies an image signal, whose polarity is periodically inverted with respect to a predetennined potential as a standard, to the pixel electrode through the data line and the switching element;

a light receiving section which receives light emitted from the electro-optical apparatus and outputs an electrical signal in accordance with the received light amount;

an adjusting section which adjusts a common potential applied to the opposing electrode to a potential at which the electronic signal output from the light receiving section has a minimum amplitude; and a setting section which sets the common potential applied to the opposing electrode to a potential higher than the potential adjusted by the adjusting section so as to suppress a difference between an effective voltage value corresponding to when the image signal is of positive polarity and an effective voltage value corresponding to when the image signal is of negative polarity, the difference being attributable to effects of variation of a potential at the pixel electrode through the switching element during a transition from an active level to a non-active level of the scanning line.

9. An adjusting apparatus for an electro-optical apparatus according to claim 8, wherein the setting section which sets the common potential applied to the opposing electrode such that the effective voltage value corresponding to when the image signal is of positive polarity substantially similar to the effective voltage corresponding to when the image signal is of negative polarity.

10. An electronic apparatus, comprising:

an electro-optical apparatus including:

a plurality of scanning lines;

a plurality of data lines;

a switching element disposed at each intersection of the plurality of scanning lines and the plurality of data lines;

a plurality of pixel electrodes electrically connected to the switching element;

an opposing electrode opposed to the plurality of pixel electrodes with an electro-optical material sandwiched there between;

a scanning-line drive circuit which selects each of the plurality of scanning lines in sequence and turns on the switching element corresponding to the scanning line; and a data-line drive circuit which supplies an image signal, whose polarity is periodically inverted using a predetermined potential as a reference, to the pixel electrode through the data line and the switching element;

a power source which supplies a voltage to the electro-optical apparatus; and an operation element which is contained in the electro-optical apparatus, the operation element adjusting a common potential applied to the opposing electrode to a potential higher than a potential at which a variation amount of light emitted from the electro-optical apparatus is minimized in the course of displaying a certain image, to suppress a difference between an effective voltage value corresponding to when the image signal is of positive polarity and an effective voltage value corresponding to when the image signal is of negative polarity, the difference being attributable to effects of variation of a potential at the pixel electrode through the switching element during a transition from an active level to a non-active level of the scanning line.

11. An electronic apparatus according to claim 10, wherein the operation element contained in the electro-optical apparatus adjusts the common potential applied to the opposing electrode such that the effective voltage value corresponding to when the image signal is of positive polarity is substantially similar to an effective voltage corresponding to when the image signal is of negative polarity.

* * * * *